(12) United States Patent
Yanagawa et al.

(10) Patent No.: US 7,486,817 B2
(45) Date of Patent: Feb. 3, 2009

(54) APPARATUS FOR AND METHOD OF GENERATING IMAGE, AND COMPUTER PROGRAM PRODUCT

(75) Inventors: Shingo Yanagawa, Kanagawa (JP); Yasunobu Yamauchi, Kanagawa (JP); Kazuki Taira, Tokyo (JP); Rieko Fukushima, Tokyo (JP); Yuzo Hirayama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 671 days.

(21) Appl. No.: 11/067,662

(22) Filed: Feb. 28, 2005

(65) Prior Publication Data

US 2005/0195478 A1   Sep. 8, 2005

(30) Foreign Application Priority Data

Mar. 2, 2004  (JP) .............................. 2004-057730

(51) Int. Cl.
*G06K 9/00* (2006.01)
(52) U.S. Cl. ..................................... 382/154
(58) Field of Classification Search ................ None
See application file for complete search history.

(56) References Cited

U.S. PATENT DOCUMENTS

| | | | |
|---|---|---|---|
| 5,768,415 A * | 6/1998 | Jagadish et al. | 382/154 |
| 6,175,379 B1 * | 1/2001 | Uomori et al. | 348/47 |
| 6,757,422 B1 * | 6/2004 | Suzuki et al. | 382/154 |
| 2003/0012425 A1 | 1/2003 | Suzuki et al. | |
| 2003/0184571 A1 | 10/2003 | Hirayama | |
| 2004/0252374 A1 | 12/2004 | Saishu et al. | |
| 2005/0105179 A1 | 5/2005 | Kazuki et al. | |

FOREIGN PATENT DOCUMENTS

| | | |
|---|---|---|
| JP | 61-144192 | 7/1986 |
| JP | 06-308426 | 11/1994 |
| JP | 07-168121 | 7/1995 |

(Continued)

OTHER PUBLICATIONS

Notice of Rejection issued by the Japanese Patent Office on Sep. 4, 2007, for Japanese Patent Application No. 2004-57730, and partial English translation thereof.
Office Action issued by the Japanese Patent Office on Jun. 5, 2007, for Japanese Patent Application No. 2004-57730, and partial English translation therefor.

(Continued)

*Primary Examiner*—Matthew C. Bella
*Assistant Examiner*—Alex Liew
(74) *Attorney, Agent, or Firm*—Finnegan, Henderson, Farabow, Garrett & Dunner, L.L.P.

(57) ABSTRACT

An apparatus includes a stereoscopic display region calculator calculating a stereoscopic display region to reproduce a three-dimensional positional relationship in image data displayed on a stereoscopic display device, based on two-dimensional or three-dimensional image data, a position of a target of regard of a virtual camera set in processing of rendering the image data, and orientations of the light beams output from the stereoscopic display device. The apparatus also includes an image processor performing image processing on image data outside a region representing the outside of the stereoscopic display region calculated by the stereoscopic display region calculator. The image processing is different from image processing on image data inside a region representing the inside of the stereoscopic display region. The apparatus also includes an image generator generating stereoscopic display image data from the two-dimensional or three-dimensional image data after processed by the image processor.

20 Claims, 17 Drawing Sheets

FOREIGN PATENT DOCUMENTS

| | | |
|---|---|---|
| JP | 08-065715 | 3/1996 |
| JP | 08-234140 | 9/1996 |
| JP | 9-74573 | 3/1997 |
| JP | 10-83460 | 3/1998 |
| JP | 2001-119724 | 4/2001 |
| JP | 2003-337957 | 11/2003 |

OTHER PUBLICATIONS

Hoshino, H. et al., "Analysis of Resolution Limitation of Integral Photography," Journal of the Optical Society of America A, vol. 15, No. 8, pp. 2059-2065, (Aug. 1998).

Notification of the First Office Action issued by the Chinese Patent Office on Jul. 11, 2008, for Chinses Patent Application No. 200510052443.6, and English-language translation thereof.

* cited by examiner

APPARATUS FOR AND METHOD OF GENERATING IMAGE, AND COMPUTER PROGRAM PRODUCT

CROSS-REFERENCE TO RELATED APPLICATIONS

This application is based upon and claims the benefit of priority from the prior Japanese Patent Application No. 2004-057730 filed on Mar. 2, 2004 the entire contents of which are incorporated herein by reference.

BACKGROUND OF THE INVENTION

1) Field of the Invention

The present invention relates to an image generating apparatus, an image generating method, and an image generating program for performing image generation in an Integral-Imaging or multi-lens stereoscopic display device.

2) Description of the Related Art

When a stereoscopic video is displayed by a stereoscopic display device, specifically, by an Integral-Imaging or multi-lens stereoscopic display device a stereoscopic display device, there is a limit region where an observer can recognize the displayed object as a stereoscopic video. When a stereoscopic video is attempted to be displayed outside the region, because the observer sees the object double or triple, it is difficult to recognize the object as a stereoscopic video.

When a three-dimensional video is created, a virtual camera for CG is set in a 3-D CG scene in which a three-dimensional object is located, and further, a point of regard of the virtual camera is set. Then, generally, rendering is performed on an image within the range displayed in the virtual camera to generate an image.

However, in the Integral-imaging or multi-lens stereoscopic display device, there is a limit for the region where the observer can see the displayed object as a stereoscopic video. Therefore, conventionally, the position of the virtual camera and the point of regard have been determined in advance, and the object is located only within the range in which it can be seen originally as a stereoscopic video to generate an image. Accordingly, an image can not be created in the same way as that for a normal three-dimensional video.

Further, as a problem common to stereoscopic display devices having capability of protruding representation including the Integral-Imaging or multi-lens system in general, there is a problem referred to as "image frame distortion".

The image frame distortion indicates a state in which, when an object seen protruding is blocked by an image frame, it becomes disappeared as if it is located before the position of the frame. In this case, that brings discomfort to the observer such that the object is seen distorted as if the object stuck to the frame or the object near the frame is seen unstable.

As methods for solving the problem of image frame distortion in a two-lens stereoscopic image display device, a method for preventing the object from being shielded by at least the outer frame of the stereoscopic display device by locating a virtual shielding object on the forefront surface is known (see Japanese Patent Application (JP-A) (Kokai) No. 08-234140). Further, a method for enlarging and projecting the visual field frame itself of the stereoscopic display device so as to be seen before other objects is known (see JP-A (Kokai) No. 06-308426). Further, a method for adjusting the ineffective display region, when part of the object disappears in the image for one eye, by regulating the display of the image for the other eye is known (see JP-A (Kokai) No. 08-65715). Further, a method for physically shielding the ineffective display region by disposing plates (diorama boards) in the ineffective display regions on the forefront surfaces of the right eye and the left eye, respectively, is known (see JP-A (Kokai) No. 07-168121).

As described above, the methods for solving the problem such as image frame distortion are proposed in a two-lens stereoscopic display device, however, there is no method for solving the problem such as image frame distortion in the Integral-Imaging or multi-lens stereoscopic display device, and a solving method is desired to be provided.

Thus, it is difficult to generate a video displayed in the Integral-Imaging or multi-lens stereoscopic display device by generating a stereoscopic video of a 3-D CG scene by locating a virtual camera and a point of regard within the 3-D CG scene like a normal virtual camera for CG.

The invention is achieved in view of the above description, and objected to provide an image generating apparatus, an image generating method, and an image generating program capable of generating images having no image frame distortion or the like and bringing no discomfort to the observer when the images are displayed in Integral-Imaging or multi-lens stereoscopic display devices in general.

SUMMARY OF THE INVENTION

It is an object of the present invention to at least solve the problems in the conventional technology.

An apparatus for generating stereoscopic display image data to be displayed on a stereoscopic display device according to one aspect of the present invention includes a stereoscopic display region calculator that calculates a stereoscopic display region to reproduce a three-dimensional positional relationship in the image data when the image data is displayed on the stereoscopic display device, based on two-dimensional or three-dimensional image data to be displayed on the stereoscopic display device, a position of a target of regard of a virtual camera set in processing of rendering the image data in a two-dimensional manner in response to light beams output from the stereoscopic display device, and orientations of the light beams output from the stereoscopic display device. The apparatus also includes an image processor that performs image processing on image data outside a region representing the outside of the stereoscopic display region calculated by the stereoscopic display region calculator. The image processing is different from image processing on image data inside a region representing the inside of the stereoscopic display region. The apparatus also includes an image generator that generates the stereoscopic display image data from the two-dimensional or three-dimensional image data after processed by the image processor.

A method of generating stereoscopic display image data to be displayed on a stereoscopic display device according to another aspect of the present invention includes calculating a stereoscopic display region to reproduce a three-dimensional positional relationship in the image data when the image data is displayed on the stereoscopic display device, based on two-dimensional or three-dimensional image data to be displayed on the stereoscopic display device, a position of a target of regard of a virtual camera set in processing of rendering the image data in a two-dimensional manner in response to light beams output from the stereoscopic display device, and orientations of the light beams output from the stereoscopic display device. The method also includes performing image processing on image data outside a region representing the outside of the stereoscopic display region calculated. The image processing is different from image processing on image data inside a region representing the inside of the stereoscopic display region. The method includes generating the stereoscopic display image data from the two-dimensional or three-dimensional image data.

The computer program product according to still another aspect of the present invention causes a computer to perform the method according to the present invention.

The other objects, features, and advantages of the present invention are specifically set forth in or will become apparent from the following detailed description of the invention when read in conjunction with the accompanying drawings.

DETAILED DESCRIPTION

Hereinafter, an embodiment of a stereoscopic image processing apparatus according to the invention is explained in detail according to the drawings. Note that this embodiment is not for limiting the invention.

An image generating apparatus 10 according to the embodiment renders image data in an arbitrary camera position and a point of regard position. Then, the device generates stereoscopic image data for display in an Integral-imaging or multi-lens stereoscopic image display device.

Figure 1:
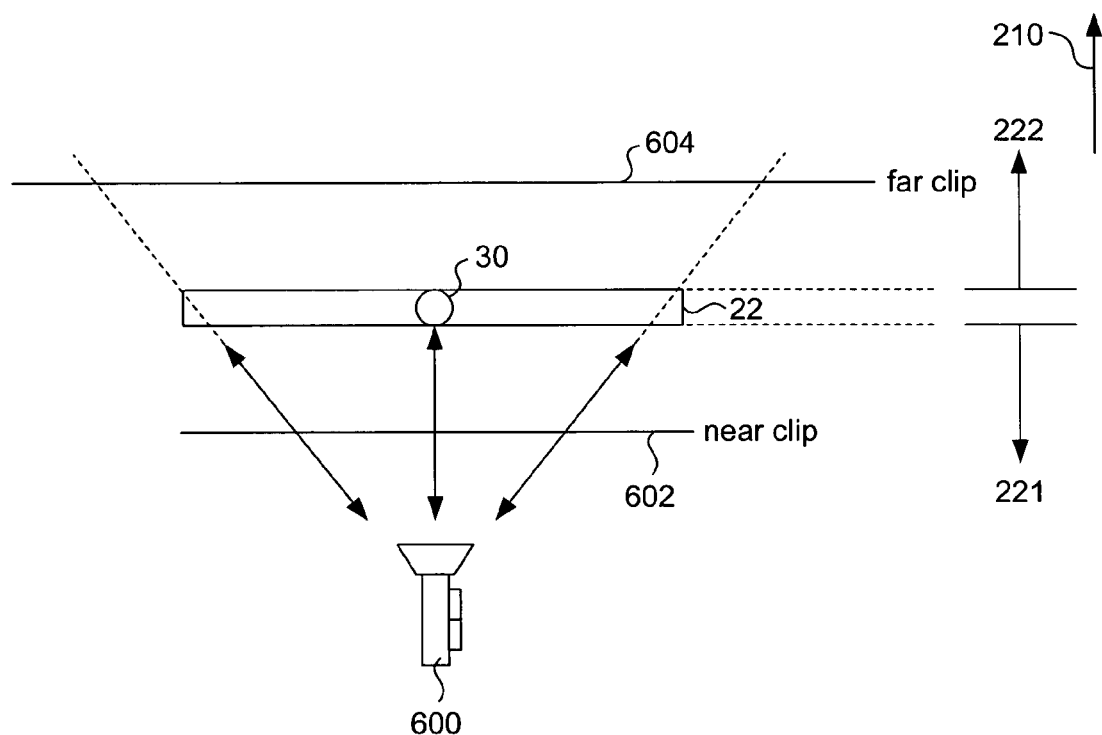
FIG. 1 is a schematic diagram indicating rendering processing.

As an assumption for explaining the functional constitution of the image generating apparatus 10, rendering processing is explained by referring to FIG. 1. The rendering processing refers to processing of rendering image data on a two-dimensional screen. In the rendering processing, a virtual camera 600 and a point of regard 30 are set. The virtual camera refers to a virtual camera located in the position determined in response to a light beam output from the stereoscopic display device. In FIG. 1, the virtual camera 600 is located at the front center of a display panel 22.

The point of regard 30 is set at the center of the display panel 22. Incidentally, the point of regard is set in the embodiment, however, a target of regard may be set in place of the point of regard.

Then, a near clip 602 and a far clip 604 are set. The near clip 602 is set in a region at the observer's side of the display panel 22, that is, in a protrusion side region 221 seen as if an object protruded. Further, the far clip 604 is set in a depth side region 222 deeper than the display panel 22 seen from the observer. Further, both the near clip 602 and the far clip 604 for the virtual camera 600 shown in FIG. 1 are provided perpendicularly to a depth direction 210 of the point of regard 30.

The space segmented by the near clip 602 and the far clip 604 is a region correctly and stereoscopically viewable, and image processing relating to stereoscopic view is performed on this region. Here, as the image processing relating to stereoscopic view, for example, there are perspective projection conversion processing of converting the three-dimensional coordinate system into the two-dimensional coordinate system and projecting an object within the space of interest onto the display panel 22, hidden surface removal processing of removing lines that could have not seen by nature, or the like.

Figure 2:
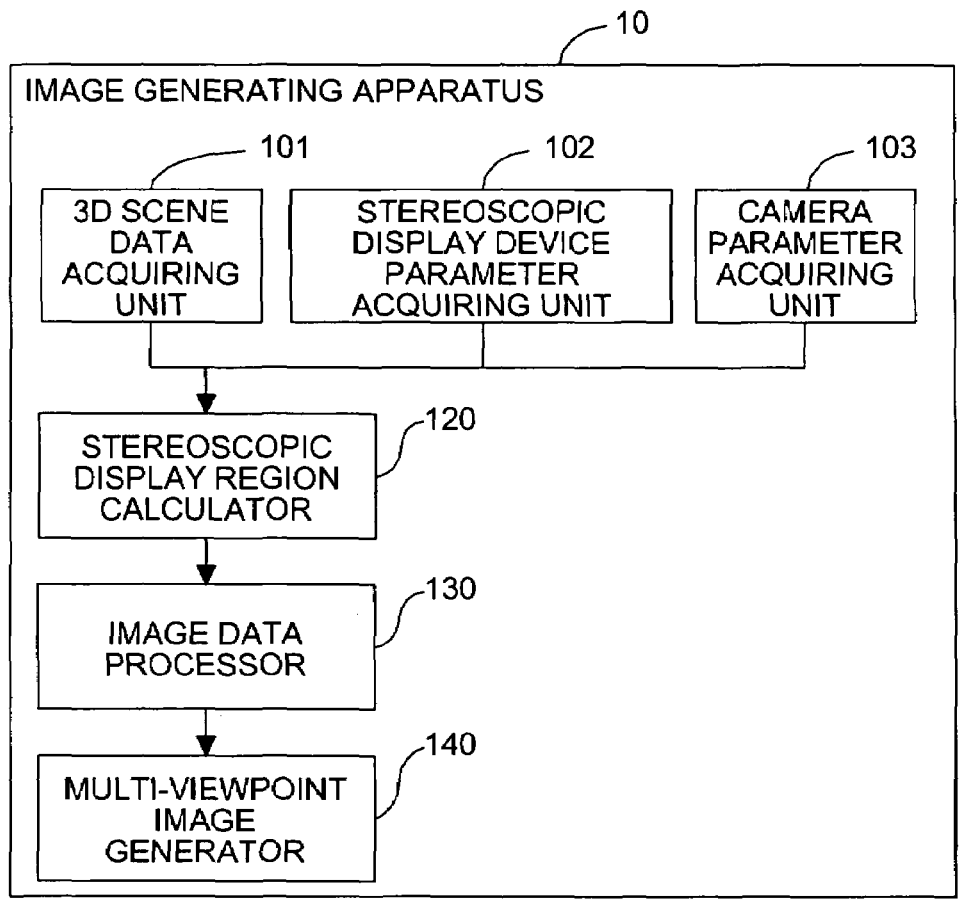
FIG. 2 is a block diagram of an image generating apparatus.

As below, the image generating apparatus 10 is explained. FIG. 2 is a block diagram that depicts the functional constitution of the image generating apparatus according to the embodiment. The image generating apparatus 10 includes a 3D scene data acquiring unit 101, a stereoscopic display device parameter acquiring unit 102, a camera parameter acquiring unit 103, a stereoscopic display region calculator 120, a image data processor 130, and a multi-viewpoint image generator 140.

The 3D scene data acquiring unit 101 acquires 3D scene data in three dimensional model space represented by a 2D or 3D object to be a target of rendering processing. Here, the number of target object may be one or more.

The stereoscopic display device parameter acquiring unit 102 acquires various kinds of parameters of the stereoscopic display device. As the various kinds of parameters, there are a view range visible for the observer in the stereoscopic display device, a pixel pitch of image data displayed by the stereoscopic display device, a lens pitch of a lenticular panel, an angle of view, a visual distance between the envisioned observer and the stereoscopic display device, an acceptable value of a Nyquist frequency obtained from these parameters, or the like. Here, the Nyquist frequency is a frequency stereoscopically viewable for the observer.

The camera parameter acquiring unit 103 acquires camera parameters in a general parallel projection camera model. As the camera parameters, there are a condition on a 2D or 3D object as a target of regard of the virtual camera in the 3D model space, a position of the virtual camera, a size of the parallel projection surface, the near clip, the far clip, or the like.

The setting conditions that the above described 3D scene data acquiring unit 101, stereoscopic display device parameter acquiring unit 102, and camera parameter acquiring unit 103 acquire are input from a user via a user interface, for example.

The stereoscopic display region calculator 120 acquires information respectively from the 3D scene data acquiring unit 101, the stereoscopic display device parameter acquiring unit 102, and the camera parameter acquiring unit 103, and calculates a region correctly and stereoscopically viewable for the observer in the display panel 22, that is, the stereoscopic display region. Specifically, it calculates a range that satisfies the acceptable value of the Nyquist frequency stereoscopically viewable for the observer, the visual distance between the envisioned observer and the stereoscopic display device, the point of regard (target of regard), a protrusion limit and depth limit from the camera parameters, and the stereoscopic display region from a region where image frame distortion occurs.

The protrusion limit refers to a boundary in the depth direction 210 in the protrusion side region 221 of boundaries recognizable as stereoscopic video. Further, the depth limit refers to a boundary in the depth direction 210 in the depth'side region 222. Note that, both the distance from a plane parallel with the camera plane on which the point of regard exists to the protrusion limit and the distance from the surface parallel with the camera surface to the depth limit are determined depending on the Nyquist frequency and the acceptable value thereof (see H. Hoshino, F. Okano, H. Isono, and I. Yuyama, Science and Technical Research Laboratories, NHK 'Analysis of resolution limitation of integral photography' Journal of the Optical Society of America-A, 1998, Vol. 15, No. 8, pp. 2059-2065).

The image frame distortion indicates a phenomenon such that, when an object seen protruding from the image frame is seen superposed with the image frame, it becomes recognized as being not located before the image frame, the object is seen distorted as if the object stuck to the frame, and a stereoscopic image is seen near the frame is seen unstable.

Figure 3:
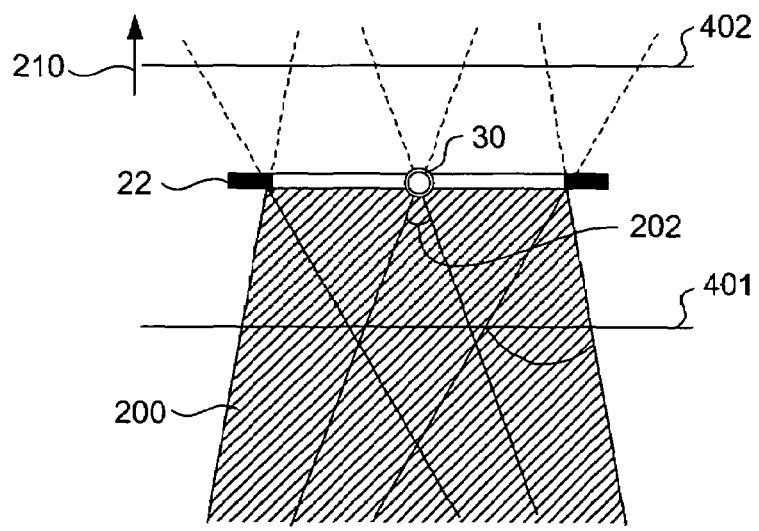
FIG. 3 is a schematic diagram indicating a protrusion limit and a depth limit.

As below, referring to FIGS. 3 to 5, the processing by the stereoscopic display region calculator 120 is explained. FIGS. 3 to 5 show light beam information output by the Integral-Imaging or multi-lens stereoscopic display device having parallax representation ability in the horizontal direction seen from above the display surface of the stereoscopic display device.

FIG. 3 is the protrusion limit 401 and the depth limit 402. Further, a region 200 is a region into which the display panel 22 outputs light beams. An output angle 202 is a range of the light beam output from the point of regard 30, that is, an output range of parallax components.

In the region 200, like as the light beams are output from the point of regard 30, the light beam at the output angle 202 is output from the respective positions of the display panel 22. Therefore, in view of the output direction of the light beam, an object as a target of stereoscopic view can be located in the region 200.

However, even when an object is within the region 200, the object located closer to the observer side than the protrusion limit 401 is seen double or triple by the observer. That is, a failure occurs in the stereoscopic view.

This is because the larger the distance from the display panel 22 toward the depth direction 210, the lower the density of the light beam information output by the display panel 22. That is, as the density of the light beam information becomes lower, the object to be seen at a distance far from the display panel 22 and an object seen from the different direction overlap and the observer sees the different objects double or triple.

The protrusion limit 401 is a limit position of the region in which density of light beam information never becomes low. Similarly, the depth limit 402 is a limit position of the region in which density of light beam information never becomes low in a direction opposite to the direction toward the observer.

Figure 4A:
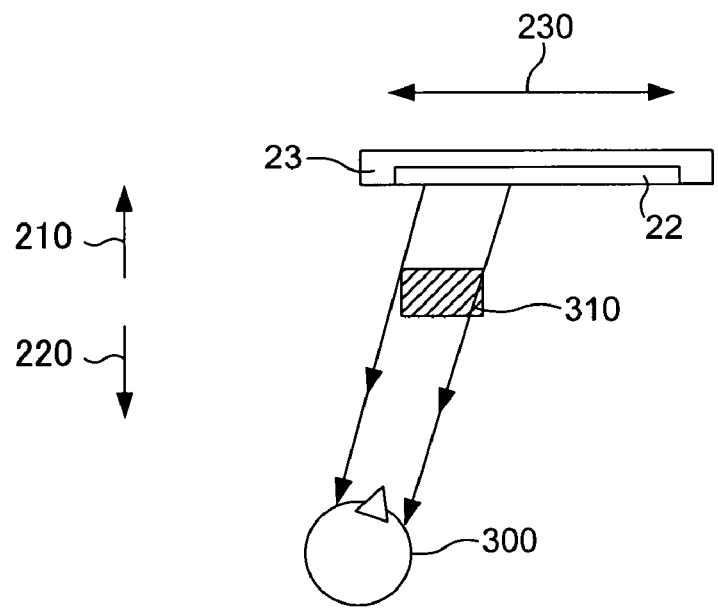
FIGS. 4A and 4B are schematic diagrams indicating image frame distortion.
Figure 4B:
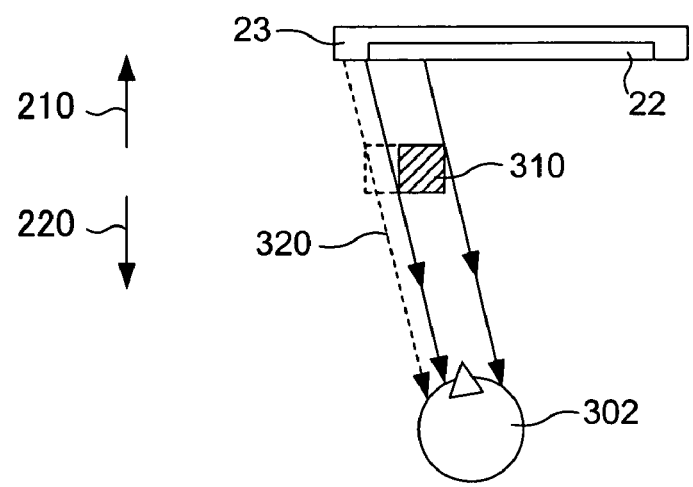
Figure 5:
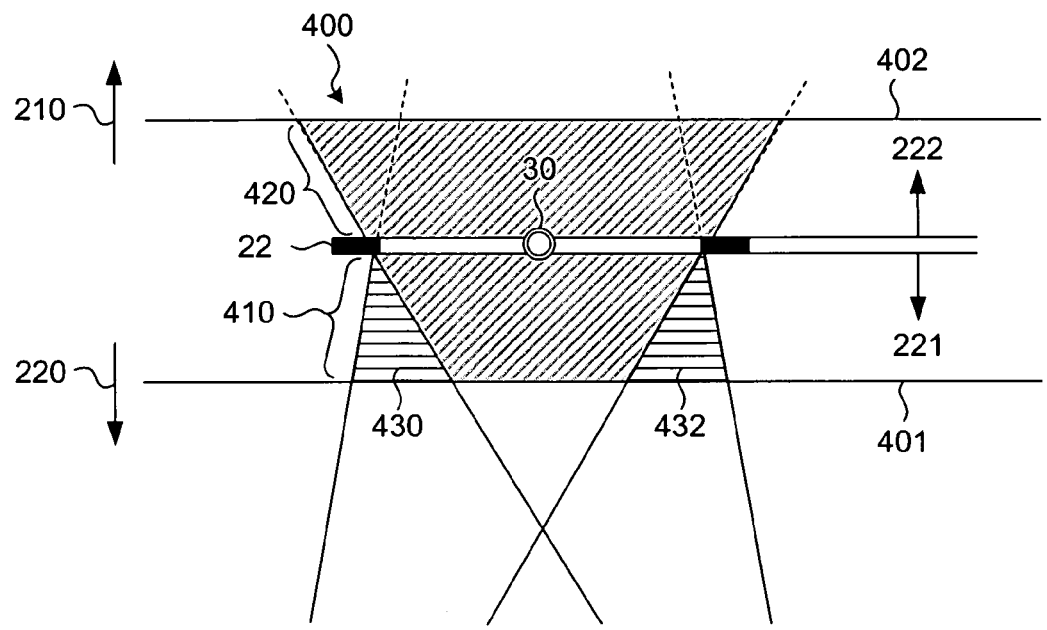
FIG. 5 is a schematic diagram of a stereoscopic display region calculated by a stereoscopic display region calculator.

FIGS. 4A and 4B are diagrams that depict the so-called image frame distortion. As shown in FIG. 4A, when the observer observes an object 310 from a position 300, both eyes can focus on the object 310. Accordingly, the observer can recognize the object 310 as being located at the front 220 of the display panel 22. However, as shown in FIG. 4B, when the observer observes the object 310 from a position 302, the right eye can focus on the object 310, but the left eye can not focus on the object 310. This is because the display panel 22 does not exist on a line 320 connecting the left eye and the object 310, and no light beam information of the object 310 enters the left eye.

The left eye further focuses on an image frame 23 of the display panel 22 located apart in the depth direction 210. Thereby, when the object 310 is seen from the position 302, due to the image frame 23 actually located apart in the depth direction 210 from the object 310, the object 310 is seen blocked.

In order to solve such image frame distortion, in a surface direction 230 of the display panel 22 of image data to be displayed on the display panel 22, depending on the position of the observer, a region except the region where the image frame distortion can occur is set as a stereoscopic display region.

FIG. 5 shows a stereoscopic display region 400 calculated by the stereoscopic display region calculator 120. The stereoscopic display region 400 has a protrusion side stereoscopic display region 410 in the protrusion side region 221 and a depth side stereoscopic display region 420 in the depth side region 222. Further, image frame distortion regions 430 and 432 are eliminated from the stereoscopic display region 400. Here, the image frame distortion regions 430 and 432 are regions where image frame distortion as described by referring to FIGS. 4A and 4B occurs depending on the position of the observer.

Thus, the stereoscopic display region calculator 120 can calculate a region correctly and stereoscopically viewable for the observer as the stereoscopic display region by limiting the depth direction 210 of the stereoscopic display region within the range in which the density of the light beam information is sufficient, and eliminating the image frame distortion regions 430 and 432 where image frame distortion occurs.

The image data processor 130 performs processing for eliminating or reducing negative effect on image data outside the stereoscopic display region, that is, a 2D or 3D object outside the stereoscopic display region, which has negative effect on stereoscopic view.

Figure 6:
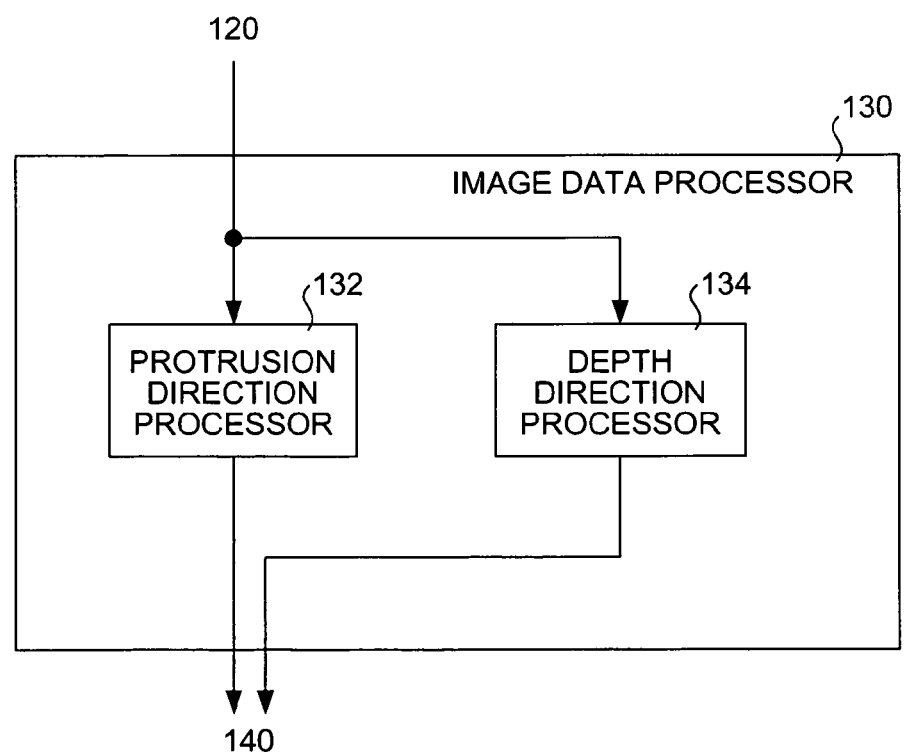
FIG. 6 is a block diagram of an image data processor.

FIG. 6 is a block diagram that depicts the detailed functional constitution of the image data processor 130. The image data processor 130 has a protrusion direction processor 132 and a depth direction processor 134. The protrusion direction processor 132 performs various kinds of processing on each object existing in the protrusion side region 221 depending on the distance between the object of interest and the target of regard. Further, the depth direction processor 134 performs various kinds of processing on each object existing in the depth side region 222 depending on the distance between the object of interest and the target of regard.

Figure 7A:
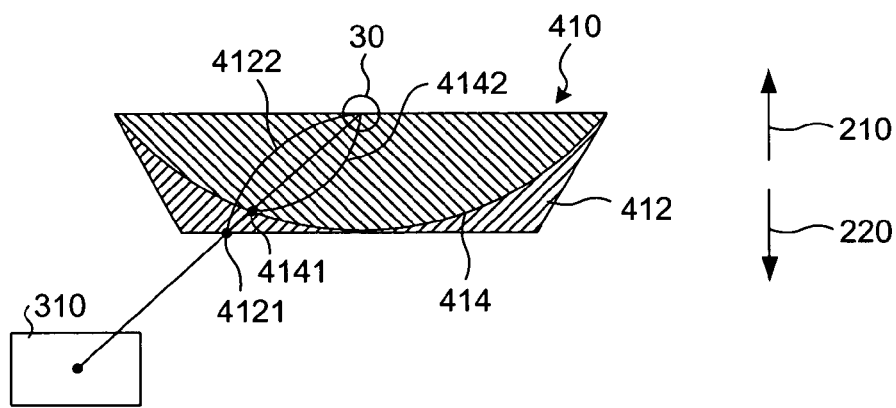
FIG. 7A is a schematic diagram of an object and a depth side stereoscopic display region when no image frame distortion occurs.
Figure 7B:
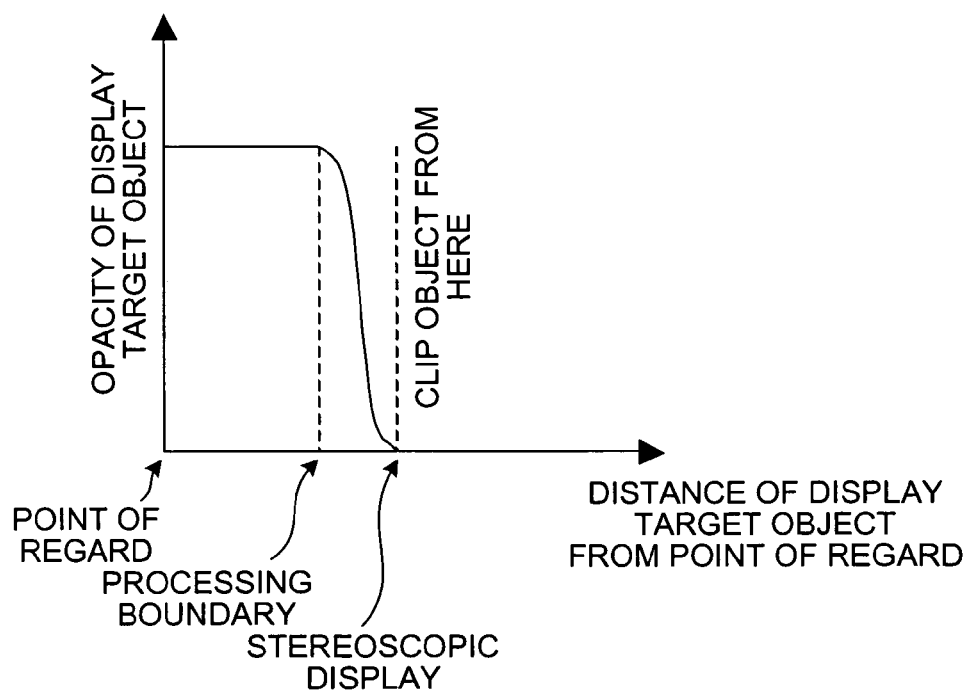
FIG. 7B is a graph of the opacity of the object at the depth side stereoscopic display region side when no image frame distortion occurs.

Referring to FIGS. 7A and 7B, the processing by the protrusion direction processor 132 is explained. FIG. 7A is the object 310 and the protrusion side stereoscopic display region 410. Note that FIG. 7A is an example of the protrusion side stereoscopic display region 410 that includes no region where image frame distortion occurs.

The protrusion direction processor 132 according to the embodiment sets in advance a processing boundary 414 at the inner side of a boundary 412 of the stereoscopic display region 400 by a predetermined distance. Further, with the processing boundary 414 as a boundary, the unit performs different processing on the object at the point of regard 30 side of the processing boundary 414, that is, at the inner side of the processing boundary 414 and the object at the observer side of the processing boundary 414, that is, at the outer side of the processing boundary 414.

Specifically, the unit performs processing on the object at the inner side of the processing boundary 414 for displaying the object with complete opacity. Further, the unit performs processing on the object in the region between the processing boundary 414 and the boundary 412 for gradually fading the object depending on the distance between the object of interest and the point of regard 30. Further, the unit performs processing on the object in the region at the observer side of the boundary 412 for completely transmitting and clipping the object.

FIG. 7B is a graph indicating the opacity of the object in image data generated by the above described processing. The horizontal axis indicates the distance from the target of regard to the object The vertical axis indicates the opacity of the object.

In the region between the processing boundary 414 and the boundary 412, fading processing is performed with intensity depending on the distance between the object and the point of regard 30. Thereby, as shown in FIG. 7B, the opacity of the object in the region where stereoscopic view becomes difficult is gradually reduced.

When the object is located at the inner side of the boundary 412 of the protrusion side stereoscopic display region 410 shown in FIG. 7A, the observer can correctly and stereoscopically view the object. For example, when an object is located between the point of regard 30 and a position 4121 at a distance 4122, the observer can correctly and stereoscopically view the object.

On the other hand, the object apart from the boundary 412 toward the observer side is clipped, the boundary position becomes clear, and there is a possibility that the observer feel discomfort when he or she stereoscopically views the object.

However, as described above, since the protrusion direction processor 132 performs fading processing on the object from the point of object 30 side of the boundary 412, unnaturalness due to clipping can be reduced.

Thus, the protrusion direction processor 132 performs different processing on each object depending on the distance between the object and the point of regard 30, and thereby, the region hard to be correctly and stereoscopically viewed can be seen and the degree at which the observer feel discomfort can be reduced.

On the region between the processing boundary 414 and the boundary 412, fading processing is performed with intensity depending on the distance between the object and the point of regard 30. For example, the intensity of the fading processing may be in proportional relation to the distance between the object and the point of regard 30. The relationship between the intensity of the fading processing and the distance between the object and the point of regard 30 is not limited especially, but may be a relationship in which the intensity is determined depending on the distance.

Further, as shown in FIG. 7B, by gradually reducing the intensity of the fading processing for the region between the processing boundary 414 and the boundary 412, the opacity of the object in the region hard to be stereoscopically viewed can be gradually reduced. Then, processing such as clipping is performed on the region at the observer side of the position of the boundary 412 when the opacity is reduced by the fading processing, and thereby, the feeling of discomfort of the observer due to the object located in the region hard to be correctly and stereoscopically viewed can be reduced.

Thus, different image processing is performed depending on the distance from the point of regard 30 with the boundary 412 as reference, and thereby, image data correctly and stereoscopically viewable for the observer with no feeling of discomfort can be generated.

Figure 8A:
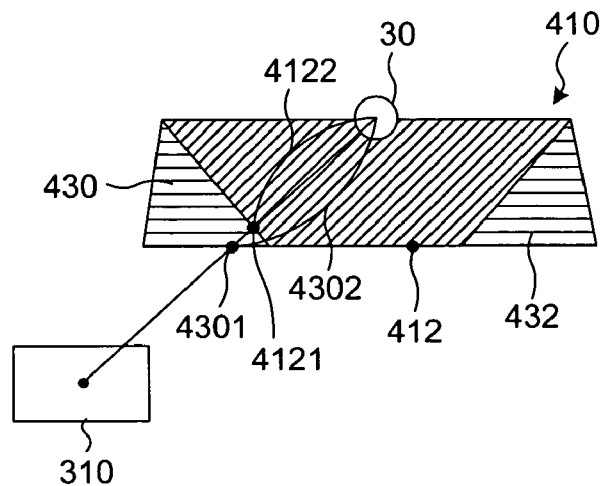
FIG. 8A is a schematic diagram of the object and the protrusion side stereoscopic display region when image frame distortion occurs.
Figure 8B:
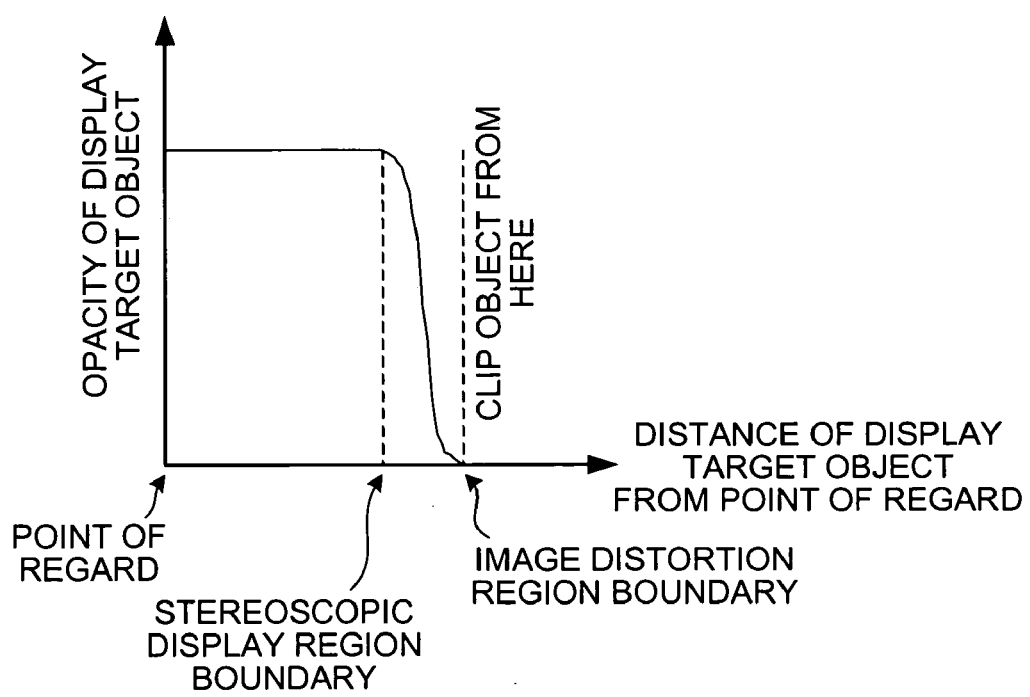
FIG. 8B is a graph of the opacity of the object at the protrusion side stereoscopic display region side when image frame distortion occurs.

The processing by the protrusion direction processor 132 when image frame distortion occurs is explained by referring to FIGS. 8A and 8B. On both ends of the protrusion side stereoscopic display region 410 shown in FIG. 8A, image frame distortion regions 430 and 432 are produced.

In this case, the protrusion direction processor 132 performs different processing on each object with the image frame distortion regions 430 and 432 and the boundary 412 as a boundary.

Specifically, the unit performs processing on the object at the inner side of the boundary 412 for displaying the object with complete opacity. Further, the unit performs fading processing on the object in the region at the inner side of the image frame distortion regions 430 and 432. Further, the unit performs processing on the object in the region at the outer side of the observer's side of the image frame distortion regions 430 and 432 for completely transmitting and clipping the object.

FIG. 8B is a graph that depicts the opacity of the object in image data generated by the above described processing. The horizontal axis indicates the distance from the target of regard to the object. The vertical axis indicates the opacity of the object.

In the region at the inner side of the image frame distortion regions 430 and 432, fading processing is performed with intensity depending on the distance between the object and the point of regard 30. Thereby, as shown in FIG. 8B, the opacity of the object in the region hard to be stereoscopically viewed is gradually reduced.

By performing the above described processing, even when image frame distortion occurs, similarly to the case where no image frame distortion occurs, the observer can correctly and stereoscopically view the object located at the inner side of the boundary 412 of the protrusion side stereoscopic display region 410. For example, when an object is located between the point of regard 30 and the position 4121 at the distance 4122, the observer can correctly and stereoscopically view the object.

As shown in FIG. 8B, by gradually reducing the intensity of the fading processing at the inner side of the image frame distortion regions 430 and 432, the opacity of the object in the region hard to be stereoscopically viewed can be gradually reduced. Then, processing such as clipping is performed on the object in the image frame distortion regions 430 and 432 at the observer side of the other boundary position when the opacity is reduced by the fading processing, and thereby, the feeling of discomfort of the observer due to the object located in the region hard to be correctly and stereoscopically viewed can be reduced.

Thus, even when image frame distortion occurs, similarly to the case where no image frame distortion occurs, image data correctly and stereoscopically viewable for the observer with no feeling of discomfort can be generated.

Figure 9A:
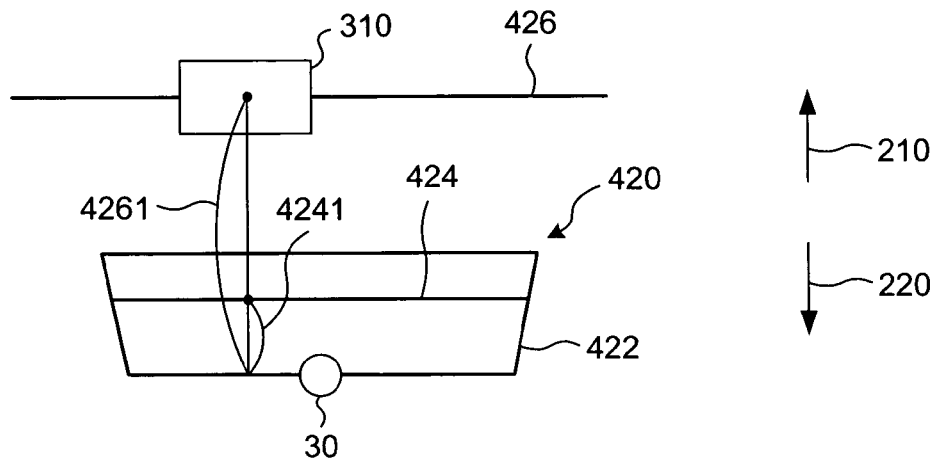
FIG. 9A is a schematic diagram of an object and a depth side stereoscopic display region.
Figure 9B:
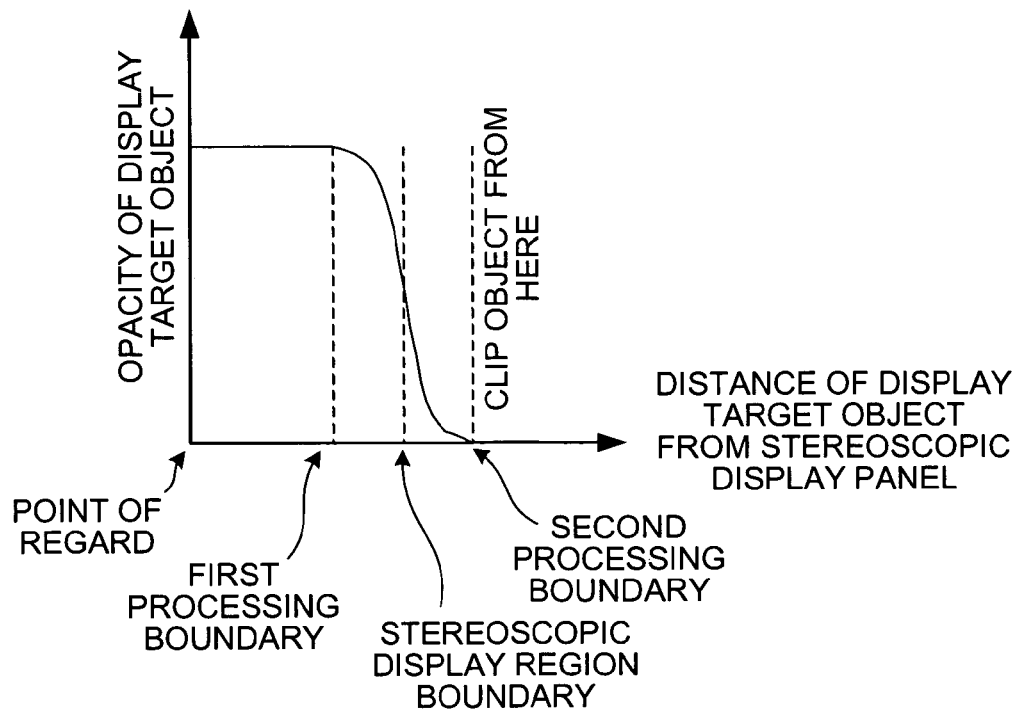
FIG. 9B is a graph of the opacity of the object at the depth side stereoscopic display region side.

The processing by the depth direction processor 134 explained in FIG. 6 is explained by referring to FIGS. 9A and 9B. FIG. 9A is the depth side stereoscopic display region 420 and the object 310.

The depth direction processor 134 according to the embodiment sets in advance a first processing boundary 424 at the inner side of a boundary 422 of the depth side stereoscopic display region 420. Further, the unit sets in advance a second processing boundary 426 at the depth side of the depth side stereoscopic display region 420.

The positions of the first processing boundary 424 and the second processing boundary 426 may be determined according to the relationship with the boundary 422, for example. For example, the position at inner side from the boundary 422 by a predetermined distance is set as the first processing boundary 424. Further, for example, the position apart from the boundary 422 by a predetermined distance may be set as the second processing boundary 426. Further, for example, the positions of the first processing boundary 424 and the second processing boundary 426 may be determined in relation to the relative distance with the boundary 422.

FIG. 9B is a graph that depicts the opacity of the object in image data generated by the above described processing by the depth direction processor 134. The horizontal axis indicates the distance from the target of regard to the object. The vertical axis indicates the opacity of the object.

On the object between the first processing boundary 424 and the second processing boundary 426, the depth direction processor 134 performs fading processing with intensity depending on the distance from the display panel 22. More specifically, the unit increases the intensity of the fading processing depending on the distance from the display panel 22. Thereby, as shown in FIG. 9B, the opacity is gradually reduced from the first processing boundary 424 to the second processing boundary 426. Then, the unit clips the object existing at the depth side of the second processing boundary 426.

Thus, by gradually increasing the intensity of the fading processing between the first processing boundary 424 and the second processing boundary 426, the object can be made to be seen as being transparent gradually. Then, clipping processing is performed on the object at the depth side of the second processing boundary 426 when the opacity is reduced by the fading processing, and thereby, the feeling of discomfort of the observer due to the object located in the region hard to be correctly and stereoscopically viewed can be reduced.

Thus, in the depth side stereoscopic display region 420, fading processing with different intensity is performed depending on the distance from the display panel 22, and thereby, image data correctly and stereoscopically viewable for the observer with no feeling of discomfort can be generated.

By the above described processing by the protrusion direction processor 132 and the depth direction processor 134, image data processing in the image data processor 130 is completed.

Incidentally, the protrusion direction processor 132 and the depth direction processor 134 according to the embodiment perform processing in units of object, however, as another example, the units may perform processing in units of polygon that forms the object. As yet anther example, the-units may perform processing in units of apex that forms the polygon.

The processing that the protrusion direction processor 132 and the depth direction processor 134 perform on the 2D or 3D object includes processing of determining the kind and intensity of effect depending on the distance from the point of regard (target of regard) to the display target object. Therefore, not only the fading processing, but processing effect for reducing the failure at the time of stereoscopic display such as gradation processing, scaling, blurring processing, and fogging may be performed, not limited to the embodiment.

Figure 10A:
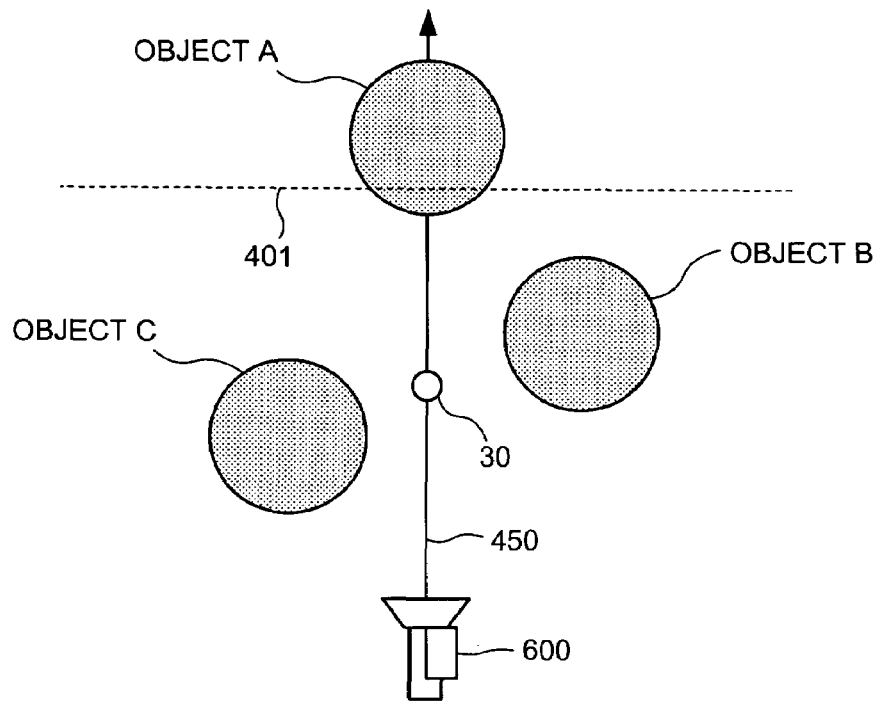
FIG. 10A is schematic diagram indicating processing by a protrusion direction processor and a depth direction processor.
Figure 10B:
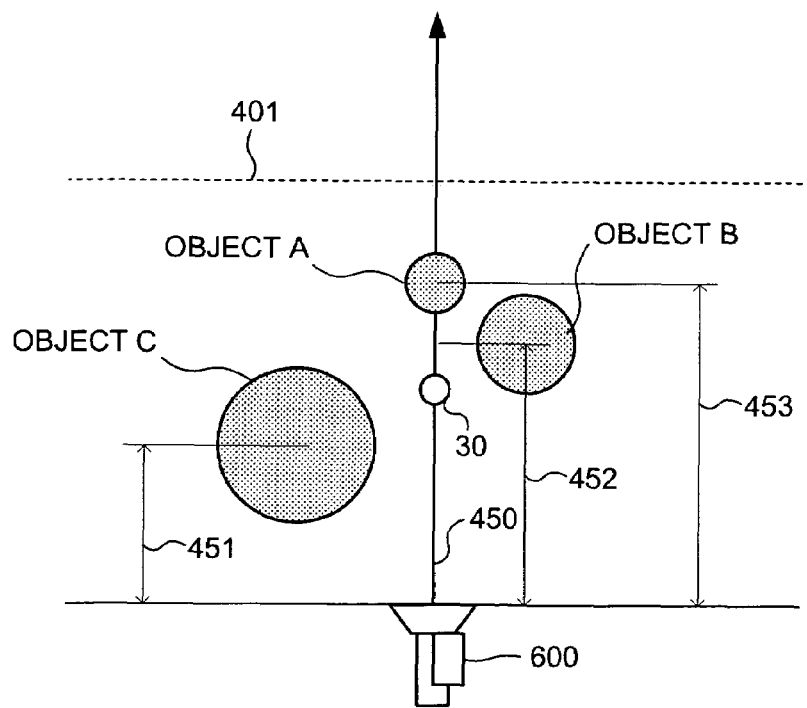
FIG. 10B is a schematic diagram indicating processing by the protrusion direction processor and the depth direction processor.

FIGS. 10A and 10B are diagrams that depict processing that the protrusion direction processor 132 and the depth direction processor 134 according to another example perform on 3D and 2D objects. In this example, the protrusion direction processor 132 and the depth direction processor 134 performs conversion processing into a scaling factor depending on the distance between a plane including located positions of the respective objects and being perpendicular to a line 450 passing through the virtual camera 600 and the point of regard 30 and a plane including the position of the virtual camera 600 and being perpendicular to the line 450.

Figure 11:
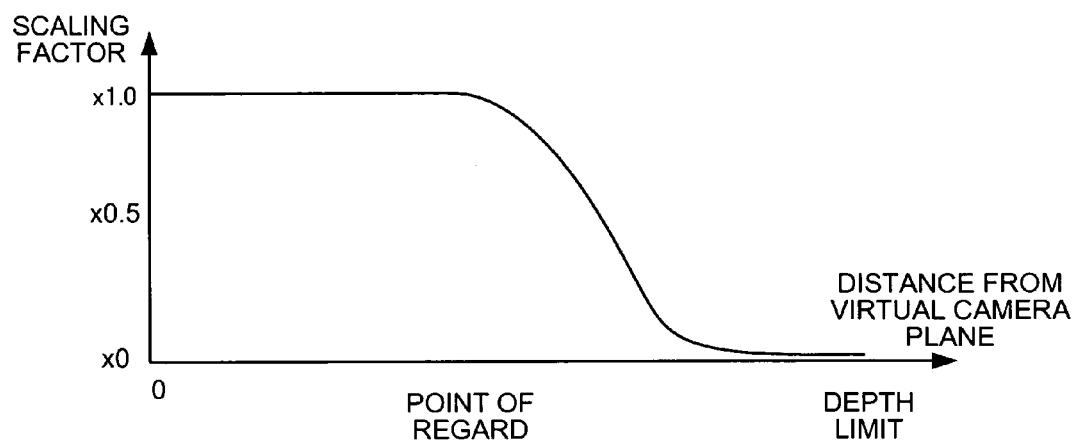
FIG. 11 is a relationship between the distance from the virtual camera plane and the processing scaling factor.

The graph shown in FIG. 11 is the relationship between the distance from the plane including the virtual camera 600 and the processing scaling factor. As shown in the graph, the farther the distance from the plane including the virtual camera 600, the lower scaling factor the conversion is performed into.

In FIGS. 10A and 10B, a distance 451 from the plane including the virtual camera 600 to a plane including an object C, a distance 452 from the plane including the virtual camera 600 to a plane including an object B, and a distance 453 from the plane including the virtual camera 600 to a plane including an object A are larger in the order. Therefore, the object C, the object B, and the object A are subjected to processing into lower scaling factor in this order.

Thus, by performing conversion on the objects into scaling factors depending on the distances from the virtual camera 600, more natural images can be generated.

The protrusion direction processor 132 and the depth direction processor 134 perform various kinds of processing on the respective objects depending on the distances between the objects of interest and the point of regard (target of regard), however, instead thereof, the unit may perform various kinds of processing depending on the distances between the objects and the boundary of the stereoscopic display region. Thus, one position as a reference for distance may be an arbitrary position within the stereoscopic display region, and not limited to that in the embodiment.

Figure 12:
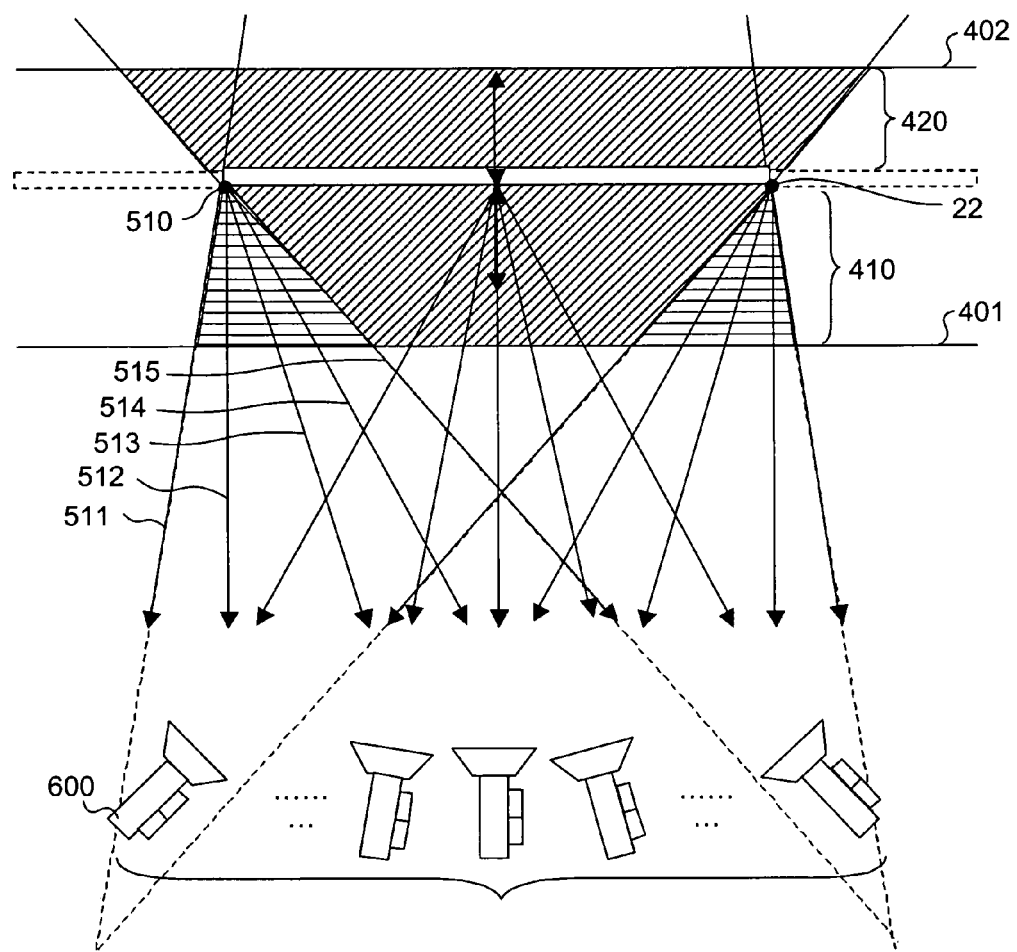
FIG. 12 is a relationship between the light beams output by the display panel of the Integral-Imaging or multi-lens stereoscopic display device and the parallel projection camera.

The multi-viewpoint image generator 140 performs multi-viewpoint rendering on image data processed by the image data processor 130. More specifically, the multi-viewpoint image generator 140 performs the processing using parallel projection cameras based on the position of the virtual camera acquired by the stereoscopic display region calculator 120 from the respective directions of parallax components of the display panels 22 acquired by the camera parameter acquiring unit 103. Referring to FIG. 12, the processing by the multi-viewpoint image generator 140 is explained in detail.

FIG. 12 is the relationship between the light beams output by the display panel 22 of the Integral-imaging or multi-lens stereoscopic display device and the virtual camera. The parallel projection cameras are located along the light beams output from the display panel 22. For example, five light beams 511 to 515 are output from a position 510 on the display panel 22. The virtual cameras (parallel projection cameras) 600 are located on extension lines of these five light beams 511 to 515, respectively. Then, rendering processing is performed in the positions of the respective virtual camera cameras 600, the processing results are mapped on the panel as light beams output by the Integral-Imaging or multi-lens stereoscopic display device.

Incidentally, since the image data processor 130 has already performed processing on the objects outside the stereoscopic display region 400 to be correctly viewable, by the processing by the multi-viewpoint image generator 140, multi-viewpoint images capable of realizing stereoscopic view with no failure can be generated.

The multi-viewpoint image generator 140 outputs multi-viewpoint images of the number of the kinds of directions of the light beams output by the Integral-Imaging or multi-lens stereoscopic display device. As another example, it may output data in which multi-viewpoint images are mapped as output from the stereoscopic display device depending on the locations of the lenticular and slits of the stereoscopic display device acquired by the camera parameter acquiring unit 103.

Figure 13:
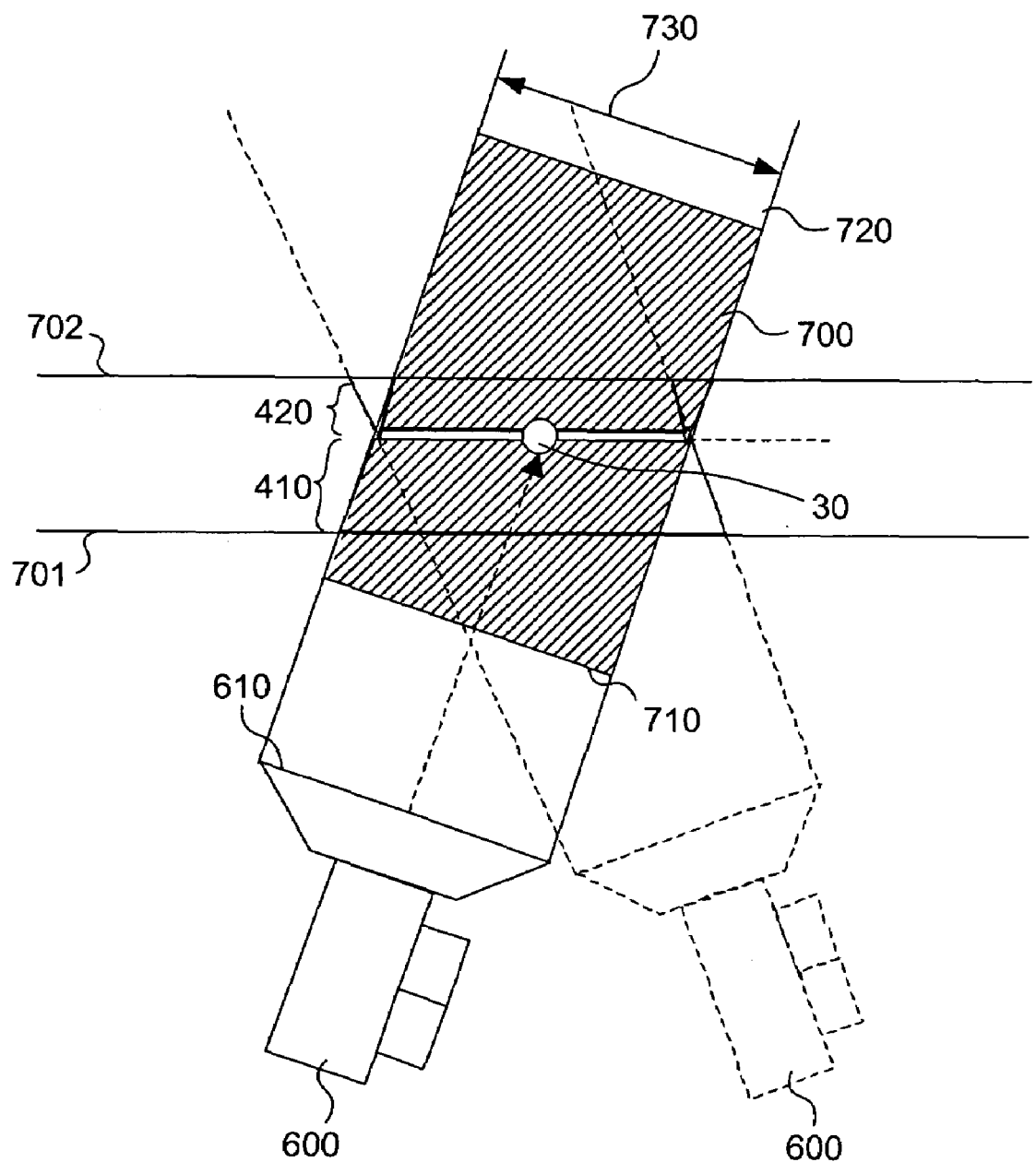
FIG. 13 is a schematic diagram indicating the processing by the multi-viewpoint image generator of generating multi-viewpoint images from predetermined directions.

FIG. 13 is a diagram that depicts the processing by the multi-viewpoint image generator 140 of generating multi-viewpoint images from predetermined directions.

The multi-viewpoint image generator 140 sets virtual cameras 600 on the extension lines of the light beams output by the display panel 22 from the target of regard 30. Then, the unit sets a near clip surface 710 of the virtual cameras 600 at the observer side of the display panel 22. Further, the unit sets a far clip surface 720 of the virtual cameras 600 in the position apart from the display panel 22 in the depth direction 210. Then, the unit performs rendering processing on a rendering range 700 between the near clip surface 710 and the far clip surface 720 of the virtual cameras 600. Here, a width 730 of the rendering range 700 is the same as the width of the camera surface 610 of the virtual camera 600.

Figure 14:
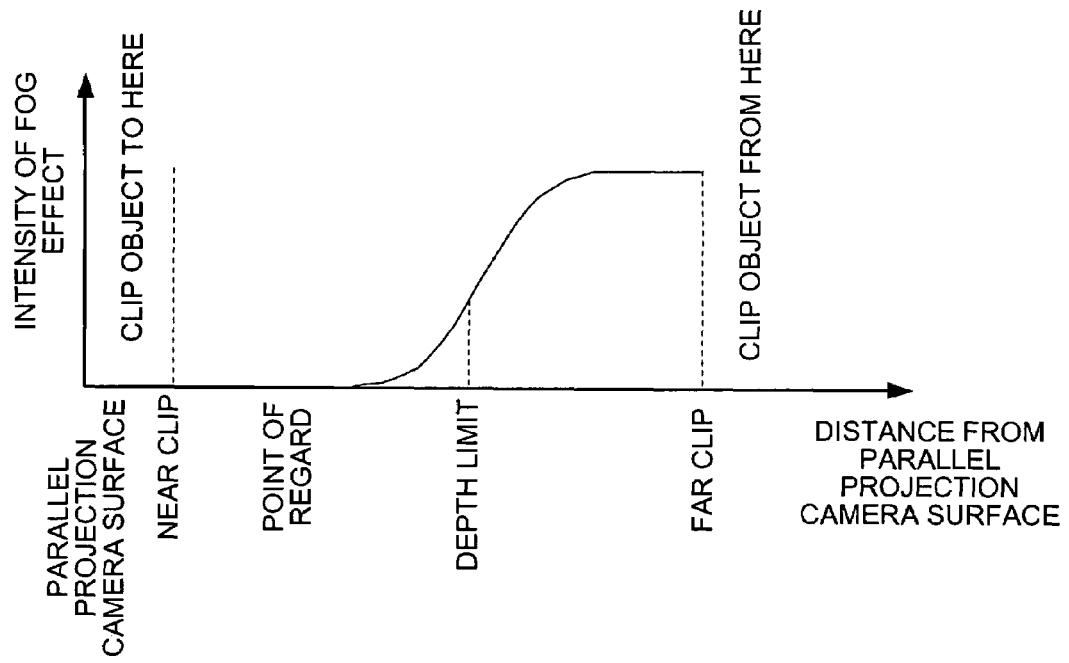
FIG. 14 is a graph of the intensity of fog effect when fog rendering is performed while changing the intensity between a near clip surface and a far clip surface.

The multi-viewpoint image generator 140 may perform rendering effect with intensity determined depending on the distance from the display panel 22. FIG. 14 is a graph that depicts the intensity of fog effect when fog rendering is performed while changing the intensity between the near clip surface 710 and the far clip surface 720. The horizontal axis indicates the distance from the display panel 22. The vertical axis is the intensity of the fog effect.

As shown in FIG. 14, the multi-viewpoint image generator 140 according to the embodiment varies the intensity of the fog rendering between the point of regard 30 and the protrusion limit 401. Thereby, the observer can see fog getting deeper gradually from the front of the protrusion limit 401. Thereby, the feeling of discomfort of the observer because of the difficulty of the stereoscopic view outside the protrusion limit 401 can be avoided.

Incidentally, in the embodiment, the multi-viewpoint image generator 140 performs fog rendering on image data, however, the processing performed on the image data may be the rendering effect for reducing the failure at the time of stereoscopic display that inhibits the correct stereoscopic view by the observer, and not limit to the fog rendering.

In the embodiment, the intensity of the rendering effect processing are differentiated depending on the distance from the display panel 22, however, as another example, the intensity of the rendering effect processing may be differentiated depending on the distance from the target of regard.

Figure 15:
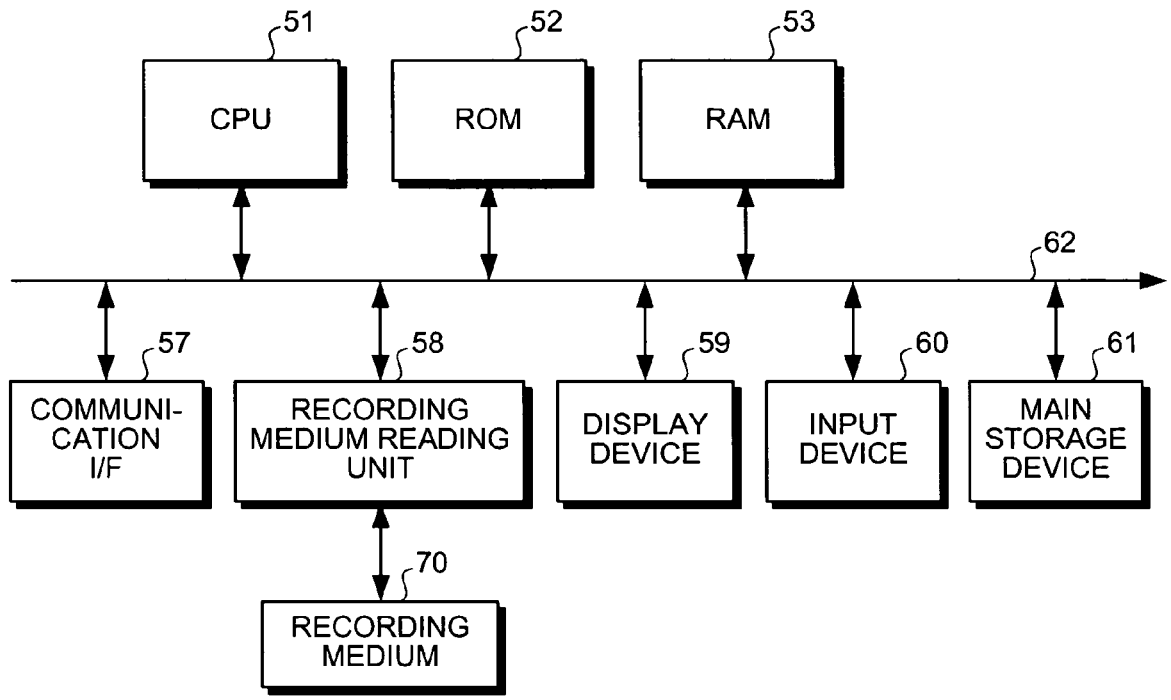
FIG. 15 is a block diagram of the hardware configuration of the image generating apparatus.

FIG. 15 shows the hardware configuration of the image generating apparatus 10 according to the embodiment. The image generating apparatus 10 includes, as the hardware configuration, a ROM 52 in which a stereoscopic image processing program for executing stereoscopic image processing in the image generating apparatus 10 or the like is stored, a CPU 51 for controlling the respective units of the image generating apparatus 10 according to the program within the ROM 52 and executing buffering time changing processing or the like, a RAM 53 in which work areas are formed for storing various data necessary for the control of the image generating apparatus 10, a communication I/F 57 that connects to a network and performs communication, a recording medium reading unit 58 that reads a program recorded in a recording medium such as a semiconductor memory, CD-ROM, DVD, and magnetic disk, for example, a display device 59 on which images or the like are displayed, an input device 60 including a keyboard, various pointing devices, or the like, a main storage device 61 for storing programs, data, or the like, and a bus 62 connecting the respective parts.

The above described stereoscopic image processing program in the image generating apparatus 10 may be recorded in a file of installable format or executable format in a computer-readable recording medium 70 such as a CD-ROM, floppy (R) disk (FD), DVD and provided.

In this case, the stereoscopic image processing program is loaded on the main storage device by being read from the recording medium 70 and executed in the image generating apparatus 10, and the respective units explained in the software configuration are generated on the main storage device.

The stereoscopic image processing program of the embodiment may be configured by being stored on a computer connected to a network such as an internet and downloaded via the network.

As described above, the invention has been described using the embodiment, however, various modifications and improvements may be added to the embodiment.

Figure 16:
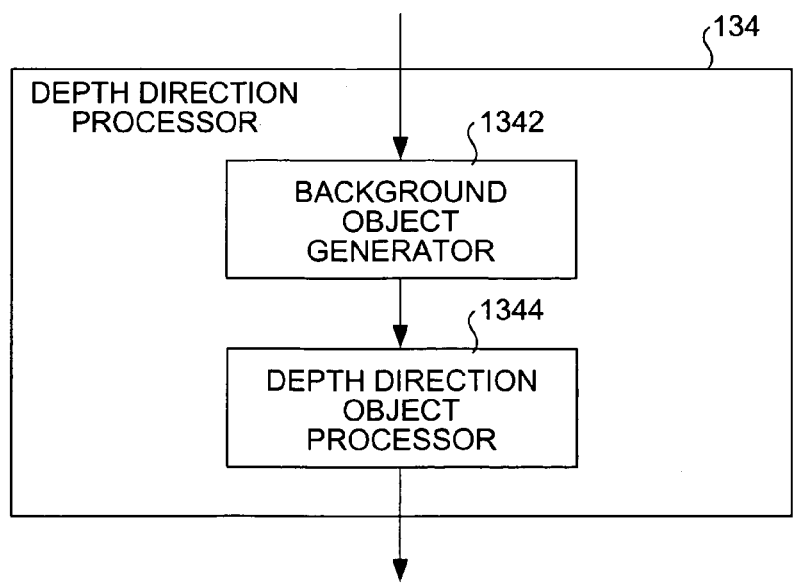
FIG. 16 is a block diagram of the depth direction processor according to a first modification.

Such a first modified example is explained. FIG. 16 is a block diagram that depicts the detailed functional constitution of the depth direction processor 134 according to the first modified example. The depth direction processor 134 according to the modified example has a depth direction object processor 1342 and a background object generator 1344.

The depth object processor 1342 performs fading processing with different intensity on objects within the protrusion side stereoscopic display region 420 like the depth direction object processor 134 according to the embodiment.

The background direction object generator 1344 performs rendering processing on a region at the deeper side than the protrusion limit 401, that is, the rendering range. Then, the unit locates the obtained 2D image in a position of the depth limit 401 as a background object. Here, no shadow of other objects appears on the background object itself.

Thus, different image processing may be performed in the protrusion side region 221 and the depth side region 222, respectively Thus, by performing different image processing depending on the positions of the respective objects, image data for enabling more natural stereoscopic view can be generated.

Figure 17:
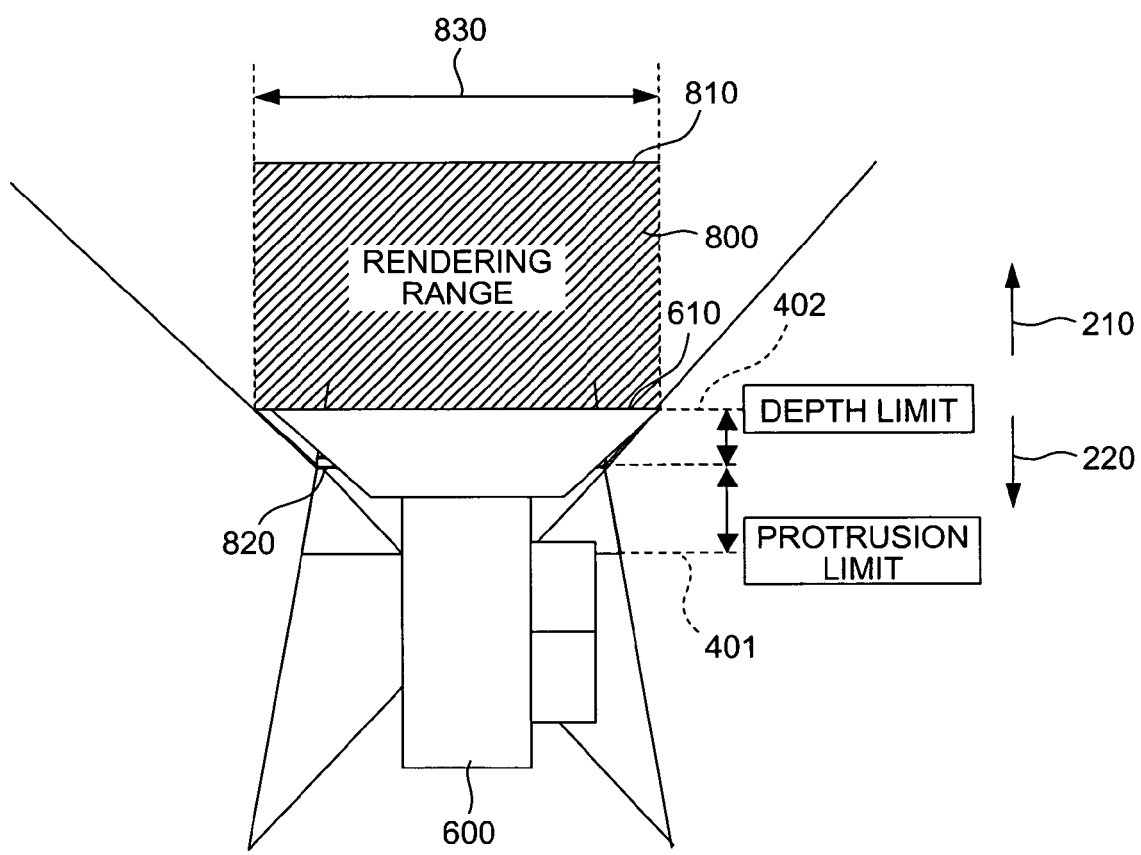
FIG. 17 is a schematic diagram indicating a rendering range in which a background object generator performs rendering processing.

FIG. 17 is the rendering range in which the background object generator 1344 performs rendering processing. The rendering range 800 shown in FIG. 17 is a range in the case of using a parallel projection camera model. The boundary position in the depth direction 210 of the rendering range 800 matches with a near clip 810 and a far clip 820 set for the protrusion limit 401. Further, the width 830 of the rendering range 800 matches with the width of the camera surface 610 of the virtual camera 600.

Incidentally, in the case of using the parallel projection camera model, the depth direction object processor 1344 may perform enlarging and reducing processing on the objects depending on the distance from the point of regard 30 or the display panel 22. In the parallel projection camera model, because the apparent size of the object does not change depending on the distance from the display panel 22, by performing enlarging and reducing processing depending on the distance from the display panel 22, the observer can feel correct stereoscopic effect.

Figure 18:
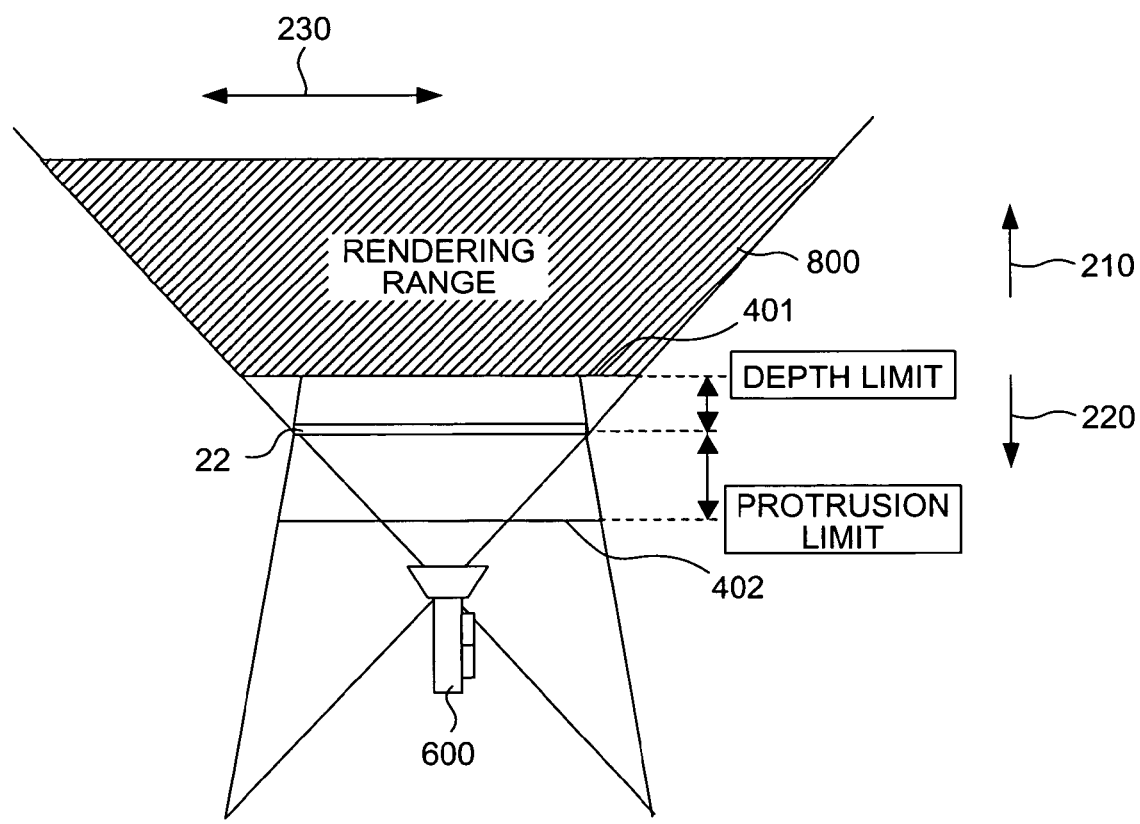
FIG. 18 is a schematic diagram indicating a rendering range in the case of using a perspective projection camera model as another modification.

FIG. 18 is the rendering range 800 in the case of using a perspective projection camera model as another example. In this case, the boundary position in the in-plane direction 230 of the rendering range 800 matches with a position along the side surface of a circular cone.

Figure 19:
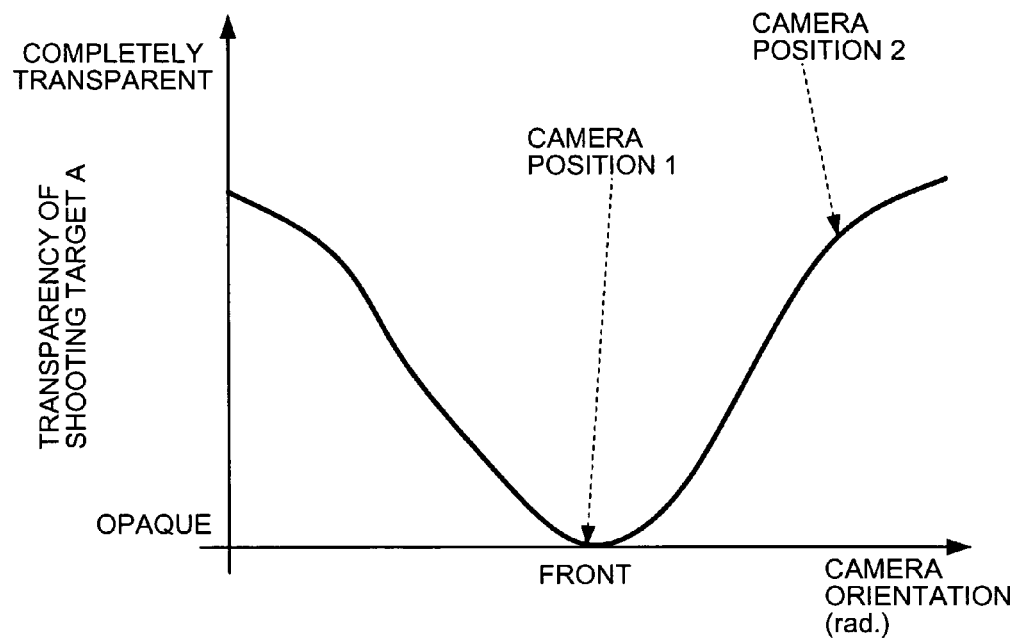
FIG. 19 is the relationship between the orientation of the virtual camera and transparency according to a second modification.
Figure 20:
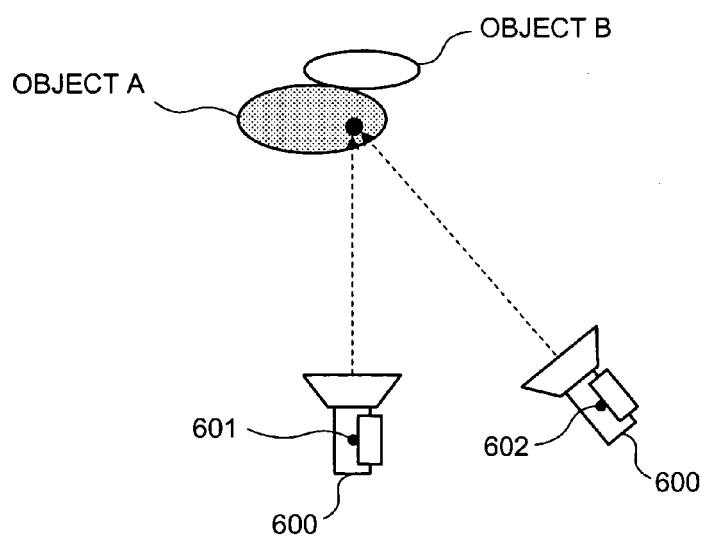
FIG. 20 is a schematic diagram indicating image processing of changing the transparency of the object A depending on the orientation of the virtual camera.

As a second modified example, the protrusion direction processor 132 and the depth direction processor 134 may differentiate the transparency of the objects depending on the orientation of the camera set in the rendering processing. FIGS. 19 and 20 are diagrams that depict image processing according to the second modified example. FIG. 19 is the relationship between the orientation of the virtual camera 600 and transparency. Further, FIG. 20 is a diagram that depicts image processing of changing the transparency of the object A depending on the orientation of the virtual camera.

As shown in FIG. 19, the protrusion direction processor 132 and the depth direction processor 134 according to the second modified example perform image processing so that the transparency of the object A may be a value determined depending on the orientation of the camera.

Figure 21A:
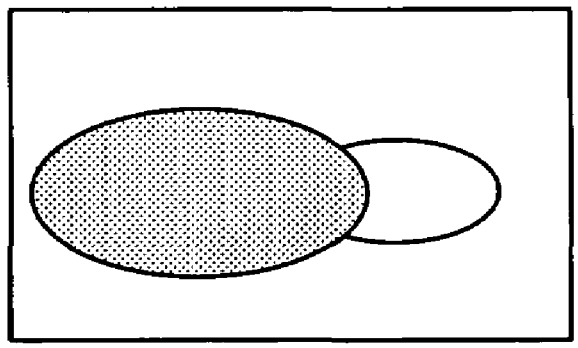
FIG. 21A is a schematic diagram indicating the condition after image processing of the object A and the object B when the object A is opaque.

Specifically, for example, as shown in FIG. 20, given that the virtual camera 600 is located in a first camera position 601 as a position in front of the point of regard of the object A, the object B is hidden behind the object A. Accordingly, in this case, the transparency of the object A is set to 0, that is, opaque. FIG. 21A shows the object A and the object B in the condition. Thus, since the object A is opaque, the portion of the object B superposed with the object A is completely hidden.

Figure 21B:
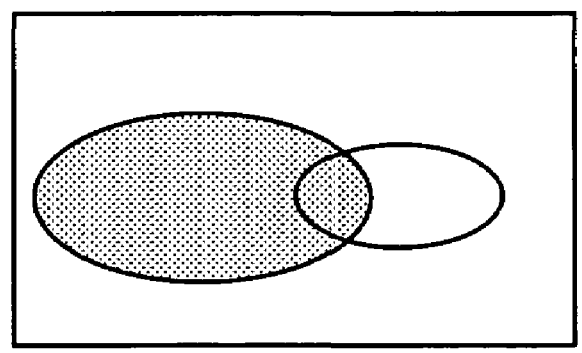
FIG. 21B is a schematic diagram indicating the condition after image processing of the object A and the object B when the object A is transparent.

Given that the virtual camera 600 is located in a second camera position 602 displaced from the camera position 601, by making the object B located behind the object A to be seen transparent, more natural impression is made on the observer. Accordingly, in this case, image processing is performed so that the transparency of the object A may be made higher compared to that in the case where the camera is located in the first camera position 601. FIG. 21B shows the object A and the object B in the condition. Thus, since the object A is not completely opaque, the object B is seen through.

Thus, according to the modified example, by changing the transparency, images providing no discomfort feeling can be generated.

Since the image generating apparatus according to the embodiments as described above can calculate the region correctly and stereoscopically viewable for the observer, that is, where the three-dimensional positional relationship can be reproduced accurately, and perform image processing suitable for the inside and the outside of the stereoscopic display region, respectively, the effect that stereoscopic display image data that the observer can correctly and stereoscopically view can be generated is exerted.

The image generating apparatus, image generating method, and image generating program according to the embodiments is useful for generating stereoscopic image data, and specifically, suitable for generating stereoscopic image data in an Integral-Imaging or multi-lens stereoscopic display device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for generating stereoscopic display image data to be displayed on an integral-imaging or multi-view stereoscopic display device, comprising:

a stereoscopic display region calculator that calculates a stereoscopic display region that excludes a region where image frame distortion occurs depending on a position of an observer from a region in which density of light beams are larger than a threshold value, to reproduce a three-dimensional positional relationship in the image data when the image data is displayed on the stereoscopic display device, based on two-dimensional or three-dimensional image data to be displayed on the stereoscopic display device, a position of a target of regard of a virtual camera set in processing of rendering the image data in a two-dimensional manner in response to the light beams output from the stereoscopic display device, and orientations of the light beams output from the stereoscopic display device;

an image processor that performs image processing on image data outside a region representing the outside of the stereoscopic display region calculated by the stereoscopic display region calculator, the image processing being different from image processing on image data inside a region representing the inside of the stereoscopic display region; and an image generator that generates the stereoscopic display image data from the two-dimensional or three-dimensional image data after processed by the image processor.

2. The apparatus according to claim 1, wherein the image processor performs gradation processing on the image data outside the stereoscopic display region.

3. The apparatus according to claim 2, further comprising an image processing controller that determines an intensity of the image processing performed by the image processor on the object, based on a position of each object in the image data outside the stereoscopic display region, wherein the image processor performs the image processing with the intensity determined by the image processing controller on the object.

4. The apparatus according to claim 3, wherein the image processing controller determines the intensity of the image processing performed by the image processor on the object, based on a distance between a position of the object in the image data outside the stereoscopic display region and a position of the target of regard.

5. The apparatus according to claim 3, wherein the image processing controller determines the intensity of the image processing performed by the image processor on the object, based on a distance between a position of the object in the image data outside the stereoscopic display region and a boundary of the stereoscopic display region.

6. The apparatus according to claim 2, further comprising an image processing controller that determines the image processing to be performed by the image processor on the object, based on a position of each object in the image data outside the stereoscopic display region,
wherein the image processor performs the image processing with the intensity determined by the image processing controller on the object.

7. The image generating apparatus according to claim 6, wherein the image processing controller determines the image processing to be performed by the image processor on the object, based on a positional relationship between the object in the image data outside the stereoscopic display region and the target of regard in a depth direction of the stereoscopic display device.

8. The apparatus according to claim 7, wherein the image processing controller determines to perform the image processing on an object located at a depth side of the stereoscopic display device outside the stereoscopic display region of locating the object of interest as a two-dimensional object.

9. The apparatus according to claim 1, wherein the image processor performs fading processing of changing transparency on the image data outside the stereoscopic display region.

10. The apparatus according to claim 9, further comprising an image processing controller that determines an intensity of the image processing performed by the image processor on the object, based on a position of each object in the image data outside the stereoscopic display region,
wherein the image processor performs the image processing with the intensity determined by the image processing controller on the object.

11. The apparatus according to claim 10, wherein the image processing controller determines the intensity of the image processing performed by the image processor on the object, based on a distance between a position of the object in the image data outside the stereoscopic display region and a position of the target of regard.

12. The apparatus according to claim 10, wherein the image processing controller determines the intensity of the image processing performed by the image processor on the object, based on a distance between a position of the object in the image data outside the stereoscopic display region and a boundary of the stereoscopic display region.

13. The apparatus according to claim 9, further comprising an image processing controller that determines the image processing to be performed by the image processor on the object, based on a position of each object in the image data outside the stereoscopic display region,
wherein the image processor performs the image processing with the intensity determined by the image processing controller on the object.

14. The image generating apparatus according to claim 13, wherein the image processing controller determines the image processing to be performed by the image processor on the object, based on a positional relationship between the object in the image data outside the stereoscopic display region and the target of regard in a depth direction of the stereoscopic display device.

15. The apparatus according to claim 14, wherein the image processing controller determines to perform the image processing on an object located at a depth side of the stereoscopic display device outside the stereoscopic display region of locating the object of interest as a two-dimensional object.

16. The apparatus according to claim 1, wherein the image processing controller determines contents of the image processing to be performed by the image processor on the image data inside the stereoscopic display region in response to the orientation of the virtual camera set in the processing of rendering.

17. The apparatus according to claim 1, wherein the image processing controller determines contents of the image processing to be performed by the image processor on the image data outside the stereoscopic display region in response to the orientation of the virtual camera set in the processing of rendering.

18. The apparatus according to claim 1, wherein the image processor performs blurring processing on the image data outside the stereoscopic display region.

19. A method of generating stereoscopic display image data to be displayed on an integral-imaging or multi-view stereoscopic display device, comprising:
calculating a stereoscopic display region that excludes a region where image frame distortion occurs depending on a position of an observer from a region in which density of light beams are larger than a threshold value, to reproduce a three-dimensional positional relationship in the image data when the image data is displayed on the stereoscopic display device, based on two-dimensional or three-dimensional image data to be displayed on the stereoscopic display device, a position of a target of regard of a virtual camera set in processing of rendering the image data in a two-dimensional manner in response to light beams output from the stereoscopic display device, and orientations of the light beams output from the stereoscopic display device;
performing image processing on image data outside a region representing the outside of the stereoscopic display region calculated, the image processing being different from image processing on image data inside a region representing the inside of the stereoscopic display region; and
generating the stereoscopic display image data from the two-dimensional or three-dimensional image data.

20. A computer program product having a computer readable medium including programmed instructions, wherein the instructions, when executed by a computer, cause the computer to perform:
calculating a stereoscopic display region that excludes a region where image frame distortion occurs depending on a position of an observer from a region in which density of light beams are larger than a threshold value, to reproduce a three-dimensional positional relationship in the image data when the image data is displayed on an integral-imaging or multi-view stereoscopic display device, based on two-dimensional or three-dimensional image data to be displayed on the stereoscopic display device, a position of a target of regard of a virtual camera set in processing of rendering the image data in a two-dimensional manner in response to light beams output from the stereoscopic display device, and orientations of the light beams output from the stereoscopic display device;
performing image processing on image data outside a region representing the outside of the stereoscopic display region calculated, the image processing being different from image processing on image data inside a region representing the inside of the stereoscopic display region; and
generating stereoscopic display image data from the two-dimensional or three-dimensional image data.

* * * * *